(12) United States Patent
Smith et al.

(10) Patent No.: US 10,585,020 B2
(45) Date of Patent: Mar. 10, 2020

(54) TIRE TESTING PROCEDURES

(71) Applicant: JAGUAR LAND ROVER LIMITED, Warwickshire (GB)

(72) Inventors: Gregory Smith, Coventry (GB); Henning Olsson, Coventry (GB)

(73) Assignee: JAGUAR LAND ROVER LIMITED, Whitley, Coventry, Warwickshire (GB)

( * ) Notice: Subject to any disclaimer, the term of this patent is extended or adjusted under 35 U.S.C. 154(b) by 123 days.

(21) Appl. No.: 15/775,074

(22) PCT Filed: Oct. 27, 2016

(86) PCT No.: PCT/EP2016/075908
§ 371 (c)(1),
(2) Date: May 10, 2018

(87) PCT Pub. No.: WO2017/080836
PCT Pub. Date: May 18, 2017

(65) Prior Publication Data
US 2018/0328818 A1    Nov. 15, 2018

(30) Foreign Application Priority Data
Nov. 11, 2015   (GB) .................................. 1519907.8

(51) Int. Cl.
*G01M 17/02*    (2006.01)
(52) U.S. Cl.
CPC .......... *G01M 17/022* (2013.01); *G01M 17/02* (2013.01)
(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 7,140,242 | B1 | 11/2006 | Poling, Sr. et al. |
| 2004/0007046 | A1* | 1/2004 | Karrer ..................... G01L 5/282 73/9 |

(Continued)

FOREIGN PATENT DOCUMENTS

| EP | 1429135 A2 * | 6/2004 | ............. B60C 11/24 |
| EP | 1 516 751 A2 | 3/2005 | |

(Continued)

OTHER PUBLICATIONS

International Search Report and Written Opinion of the International Searching Authority for International application No. PCT/EP2016/075908 dated Jan. 25, 2017.

(Continued)

*Primary Examiner* — Andre J Allen
(74) *Attorney, Agent, or Firm* — Carlson, Gaskey & Olds (57) ABSTRACT

A method of performing a test on a tyre to record data for parameterisation of a tyre model, wherein the method is performed on a tyre mounted on a wheel and supported on a mobile axle with respect to a movable testing surface. The method includes supporting the tyre with respect to the movable test surface such that the slip angle of the tyre is controllable and such that the loading on the tyre is controllable, steering the tyre with respect to the test surface so as to vary the tyre slip angle, and applying load to the tyre in dependence on tyre slip angle so as to simulate real life tyre loading conditions. Aspects and embodiments of the invention also provide a computer program product and a machine readable medium. Beneficially, the method results in a tyre being tested under more realistic conditions since the applied tyre loading varies in dependence on the tyre slip angle, thereby mimicking the loading on the tyre experienced as vehicle weight transfers during cornering. This ensures that accurate tyre performance data representing the real-life performance envelope of the tyre is captured during (Continued)

testing, whilst test time can be saved by not testing load cases which the tyre will never experience on a real vehicle.

15 Claims, 8 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/0486; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28

See application file for complete search history.

(56) References Cited

U.S. PATENT DOCUMENTS

| | | | |
|---|---|---|---|
| 2009/0000371 A1* | 1/2009 | Hanada | G01M 17/022 73/146 |
| 2009/0055040 A1* | 2/2009 | Nagaya | B60C 23/0408 701/31.4 |
| 2010/0257925 A1 | 10/2010 | Oblizajek et al. | |
| 2012/0260726 A1* | 10/2012 | Cuttino | G01M 17/021 73/146 |
| 2013/0068006 A1* | 3/2013 | Cuttino | G01M 17/02 73/118.01 |
| 2014/0090461 A1* | 4/2014 | Cuttino | G01M 17/021 73/118.01 |
| 2015/0033840 A1* | 2/2015 | Litz | G01M 17/022 73/146 |

FOREIGN PATENT DOCUMENTS

| | | |
|---|---|---|
| EP | 2 009 418 A2 | 12/2008 |
| WO | 2013/040148 A2 | 3/2013 |
| WO | 2016/022331 A1 | 2/2016 |

OTHER PUBLICATIONS

Combined Search and Examination Report under Sections 17 and 18(3) for Application No. GB1519907.8 dated May 12, 2016.

* cited by examiner

TIRE TESTING PROCEDURES

TECHNICAL FIELD

The present disclosure relates to improvements in or relating to tyre testing procedures, and in particular, but not exclusively, to a method of performing a test on a tyre in order to record data electronically for parameterisation of a tyre model. The method is performed on a computer controlled, programmable, tyre testing apparatus. Thus, the disclosure also relates to a computer program product that is configured for implementing the method, and a machine readable medium having stored thereon such a computer program product. Aspects of the invention relate to a method of performing a test on a tyre to record data for parameterisation of a tyre model and a tyre testing apparatus.

BACKGROUND

Manufacturers in the automotive industry are striving continually to provide vehicles with enhanced design and performance features in order to meet with the growing demands of consumers. Furthermore, the sector must comply with increasingly strict government regulations which set out minimum requirements in terms of vehicle safety and fuel economy. Vehicle manufacturers must therefore produce new vehicle models which not only comply with fuel efficiency and safety standards, but also incorporate innovative technologies to attract consumers to their products. These factors all act to impact the time and cost required to develop new vehicles, for which manufacturers have strict targets to meet if they are to stay relevant in the competitive global automotive market.

It is therefore important for vehicle manufacturers to reduce the time and cost associated with the vehicle development cycle. A widely used method for achieving this is the use of vehicle simulation. Vehicle simulation is a valuable tool used during the test and development cycle which allows vehicle behaviour to be modelled so as to ensure that vehicle developments have the desired effect on performance. Vehicle simulation improves the efficiency of the development and testing process which in turn reduces time and expenditure. For this reason, vehicle simulation is used extensively within the automotive industry.

Computer-implemented or 'virtual' vehicle simulations are advantageous in a number of ways. In physical testing, the need for fully assembled test cars, drivers, venues and fuel leads to very high costs, acting as a barrier to automotive companies using these techniques. This gives virtual testing a major advantage over physical testing, allowing a large number of variables to be included and tests to be undertaken at significantly reduced expense. A further benefit of using virtual simulation is that it allows for improved repeatability when compared with physical testing, where it may be difficult to exactly reproduce a given test situation/environment.

In order for virtual vehicle simulation to be effective, high quality test data must be available for use in the vehicle models. To build a full vehicle model which accurately represents the performance of the vehicle, it is necessary to model the various components of the vehicle. One of the most challenging components to model is the tyre, which exhibits complex, non-linear behaviour.

There are a number of models which can be used to simulate tyre performance, one of which is known as the 'Magic Formula' (MF) model. This model was developed through collaboration between Volvo cars and Delft University of Technology and has become the benchmark for tyre modelling, utilised widely in the automotive industry, as well as across academia. The MF model is an empirical model which predicts tyre behaviour using data gathered from tyre testing. For this, the model provides a set of mathematical formulae from which the forces and moments acting from the road to the tyre can be simulated for both steady-state and transient tyre behaviour, for pure lateral cornering, braking and driving, in addition to combined handling conditions. Since the MF model was first developed, it has gone through various iterations where additional features have been added and improvements have been made, with the most up-to-date version being MF6.1.

To obtain tyre data for use in the MF model and others like it, specially designed test rigs are used which can test a range of tyre types including passenger car, light truck, SUV and motorsport tyres. These rigs typically consist of a pair of drums around which a steel belt is wrapped to provide the tyre testing area on which an appropriate test surface (such as sandpaper) is affixed. For testing, the tyre is rotatably mounted onto a control arm. In these set-ups, variables such as speed, load, inflation pressure and true tyre motion relative to the road surface can be controlled, allowing for a broad range of tyre behaviour to be measured. A major concern for the automotive industry in terms of tyre testing is the expense associated with renting one of these rigs for use. It is, of course, advantageous for tyre data to be collected efficiently in any case, but with the added consideration of expensive rig time, it becomes even more beneficial to obtain the most data in the shortest possible time, without compromising on quality. For this, an efficient and accurate test procedure is required.

There are various existing methods for testing tyres to gather data for use with, that is to say, to 'parameterise', the MF6.1 model. One such test procedure is the square matrix approach. The square matrix approach uses a set of constant loads, cambers and inflation pressures, and collects data across a range of slip angles and slip ratios. The chosen slip angle range is swept across at each of the chosen constant load cases under free rolling conditions (when there is no braking or acceleration). To obtain longitudinal data, sweeps are conducted across the chosen slip ratio range at each of the chosen constant load cases for a constant slip angle. Combined data is gathered by repeating the data sweeps conducted across the slip ratio range at typically three constant slip angles. A clear disadvantage of this method is the high number of sweeps that are required to collect the necessary data. For example, given four loads, three cambers, three inflation pressures, and combined testing at three different slip angles, the square matrix approach would require a total of 144 separate sweeps to be undertaken, which is time consuming and, hence, costly.

In general, there is a need to develop tyre testing methods and techniques which improve the efficiency of the data gathering exercise whilst maintaining and even improving the quality of data that is acquired.

It is against this background that the invention has been devised.

SUMMARY OF THE INVENTION

Aspects and embodiments of the invention provide a method, a computer-controlled apparatus, a computer program product and a machine readable medium as claimed in the appended claims.

According to an aspect of the invention, there is provided a method of performing a test on a tyre to record data for parameterisation of a tyre model, wherein the method is performed on a tyre mounted on a wheel and supported on a mobile axle with respect to a movable testing surface. The method includes steering the tyre with respect to the test surface so as to vary the tyre slip angle, and applying load to the tyre in dependence on tyre slip angle. Usefully, this approach has the effect of simulating real life tyre loading conditions.

A benefit of the above method is that the tyre is tested under more realistic conditions since the applied tyre loading varies in dependence on the tyre slip angle, thereby mimicking the loading on the tyre experienced as vehicle weight transfers during cornering. This ensures that accurate tyre performance data representing the real-life performance envelope of the tyre is captured during testing, whilst test time can be saved by not testing load cases which the tyre will never experience on a real vehicle.

A significant saving in test time can be achieved in this way, without sacrificing the quality of data that is captured, and the resulting accuracy of the tyre model that is parameterised with the captured data.

Optionally, the load applied to the tyre may be controlled so as to increase when the tyre slip angle is moved in a first direction and may be controlled so as to decrease when the tyre slip angle is moved in a second direction. Once again this load profile reflects the weight transfer that is expected to occur on a vehicle during cornering.

The tyre test method may start with the tyre at a neutral slip angle position, being, for example, when the tyre points in the direction of travel. Expressed another way, this is when the rotational axis of the tyre is perpendicular to the direction of movement of the movable surface. At this neutral slip angle position, the load on the tyre may be selected to be at a first predetermined load value.

In one embodiment, the tyre may be moved from the neutral slip angle position progressively to a first predetermined slip angle position, during which movement the load on the tyre is varied progressively to a second predetermined load value. The first predetermined slip angle position may be a positive slip angle position.

During this movement, the load on the tyre may saturate at a selected value, which reflects the point when the tyre would be generating peak lateral force such that no further weight transfer can take place. So, when the tyre is moved from the first predetermined slip angle position to a second predetermined slip angle position, the load on the tyre may be maintained at a substantially constant load value.

Furthermore, the tyre may be moved from the neutral slip angle position progressively to a third predetermined slip angle position, during which movement the load on the tyre is varied progressively to a third predetermined load value. The third predetermined slip angle position may be a negative slip angle, which, in effect, means that the tyre is pointed in the 'opposite' direction when compared to the previous case when the tyre was at a positive slip angle position. Once again, the load on the tyre may be controlled so that it saturates at a selected load value above a certain slip angle. That is, when the tyre is moved from the third predetermined slip angle position to a fourth predetermined slip angle position, the load on the tyre may be maintained at a substantially constant load value.

In the embodiments, the slip angle of the tyre may be controllable continuously between approximately −30 degrees and +30 degrees. However, in order to reflect real-life tyre load cases, the first tyre slip angle position may be between +1 degrees and +10 degrees, whilst the third tyre slip angle position may be between −1 degrees and −10 degrees.

In another aspect, the invention relates to a tyre testing apparatus comprising a mobile axle, a movable testing surface, and control means. The mobile axle is configured to support a wheel, the wheel having a tyre (14) mounted thereon. The control means (32) is configured to control the position and orientation of the mobile axle to implement the method described above. The control means may comprise a controller, a processor or any other suitable means operable to control the position and orientation of the mobile axle.

Aspects of the invention also relate to a computer program product downloadable from a communication network and/or stored on a machine readable medium, comprising program code instructions for implementing the above method, and a machine readable medium having stored thereon the aforementioned computer program product.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

As has already been discussed, modelling of tyre behaviour in the context of a wider vehicle dynamic model is a known technique. A commonly known form of tyre model is the Magic Formula (MF) 6.1 model, although this is provided here only as an example since other tyre models are available in the art, but similar principles apply.

In such models, it is typical to use vertical load, camber angle, and slip angle as inputs. As is known, the camber angle is the measure in degrees of the difference between the wheels vertical alignment and the axis perpendicular to the surface, when viewed from the front of the vehicle. When the wheel is perpendicular to the surface the camber angle is 0°. The camber angle is negative when the top of the wheel is tilted towards the vehicle and positive for the opposite situation. The slip angle is the angle between the direction of travel of a rolling wheel and the direction in which the wheel is pointing. References to these terms in this description will be understood as being consistent with this convention.

Figure 1:
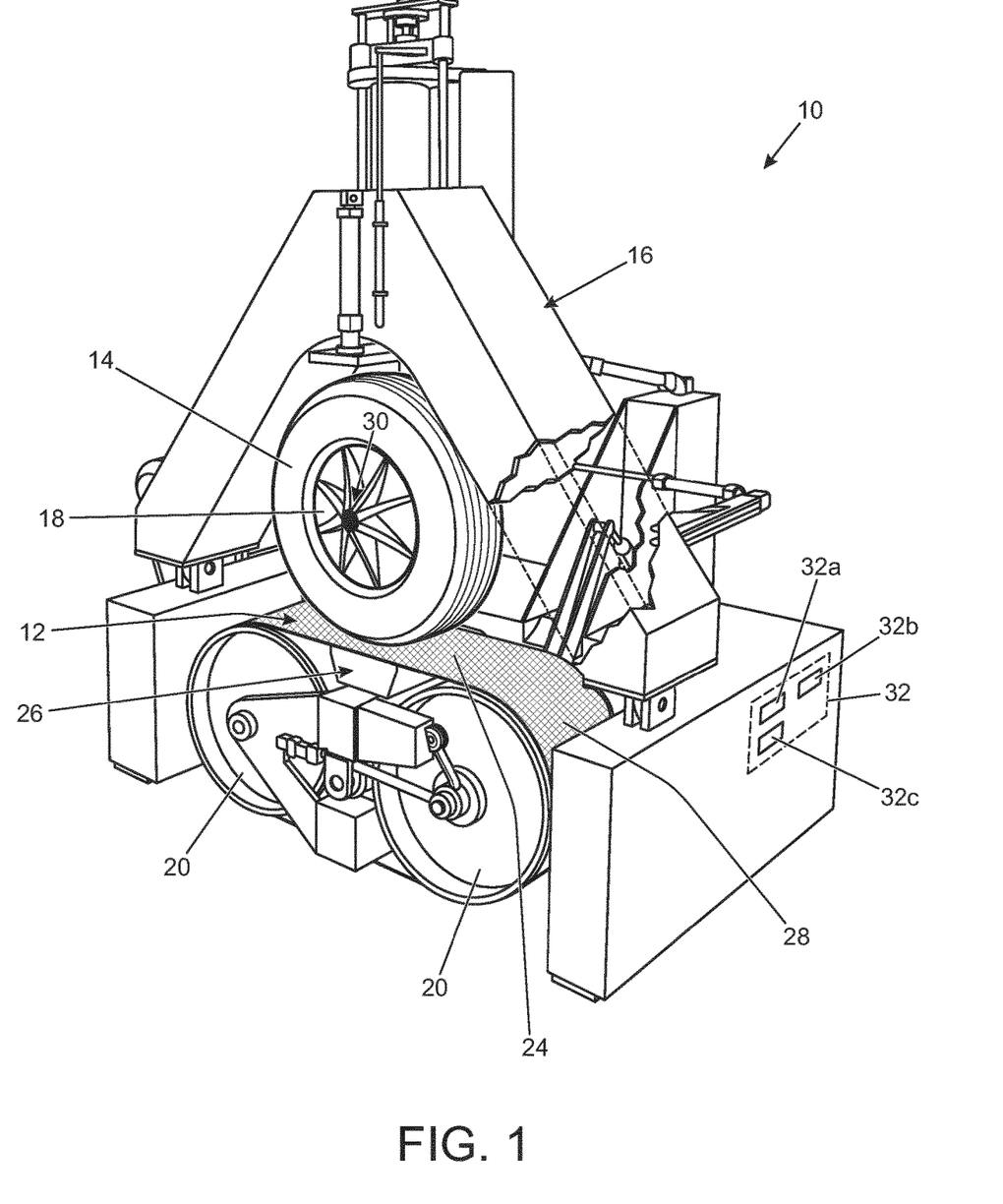
FIG. 1 is a front oblique view of a tyre test machine or apparatus, to which the tyre tests of the embodiments of the invention are applicable.

In order to obtain the necessary data to parameterise the performance of a tyre under a range of loads, slip angles, camber angles, inflation pressures and so on, it is established practice to test the tyre on a dedicated test apparatus. One such apparatus 10 is shown in FIG. 1, by way of example, and includes a flat testing surface 12, or 'track', above which a tyre 14 is moveably supported by a support structure 16. The tyre 14 is mounted on a wheel 18 but for the purposes of this description references to a tyre being moved, steered, and having a load applied thereto, will be understood to refer to a combination of the wheel and the tyre.

The testing surface 12 is provided by a pair of drums 20 around which a belt 22 is wrapped to provide a substantially flat test region 24 for the tyre 14. The belt 22 is usually steel, but other suitable materials may also be used. The test region 24 may also be supported by a hydrodynamic bearing 26 to provide a robust and low friction backing for the belt 22 as loads are applied to it through the tyre 14. The belt 22 carries a suitable covering 28, such as sand paper that mimics the fiction properties of a road and so provides the test surface 12 for the tyre 14.

The support structure 16 overhangs the test surface 12 and provides a movable or 'mobile' axle 30 on which the tyre 14 is supported. It will be appreciated that the axle 30 is referenced at the centre of the wheel 18 in FIG. 1, since a reverse view of the apparatus 10 is not provided. The axle 30 is mounted to a control arm (not shown, but its presence is implicit) which is able to control at least the vertical and horizontal positions of the tyre 14 with respect to the test surface 12 and also its orientation. Therefore, the control arm is operable to apply variable vertical loads to the tyre, camber angles, slip angles and so on. The apparatus 10 is equipped with a computer control system 32, which is shown schematically in FIG. 1. The computer control system 32 is configured to implement a pre-programmed test procedure during which the control arm subjects the tyre 14 to a series of tests by controlling its position and orientation relative to the testing surface 12. As such, the computer control system 32 is provided with a suitable memory area 32a, control means in the form of a controller or processor 32b and control interface 32c, which components are shown schematically in FIG. 1. The processor 32b may be operable to implement a computer program product comprising program code instructions that is stored on the memory area 32a. The computer program product may be installed on the memory area 32a via the interface 32c, for example loading into the system 32 from a hardware-based memory device, or downloaded from a communications network.

The reaction forces generated by the tyre 14 on the control arm can be measured and recorded by the computer control system 32. This data may therefore be used for parameterising the performance of the tyre for use in a suitable tyre model, as discussed above. Such a testing apparatus is known in the art and so a further detailed discussion of the apparatus will not be provided here for the sake of brevity. However, one example is the Flat Trac Tire Testing System available from MTS Systems Corporation, MN, USA. 'Flat Trac' and MTS Systems Corporation are hereby acknowledged as trade marks. Other comparable testing systems are also available.

Figure 2:
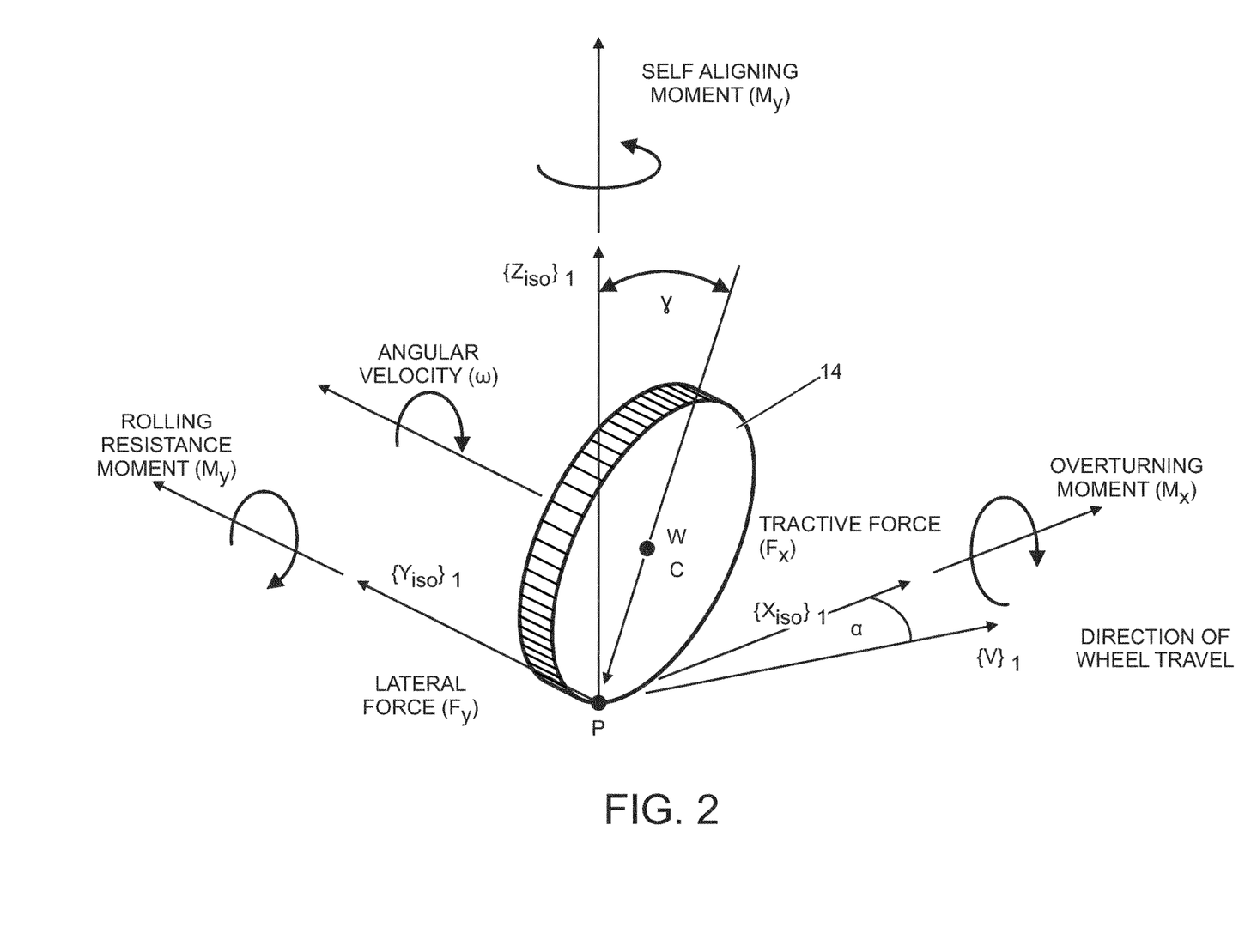
FIG. 2 illustrates a tyre model coordinate system applying ISO conventions.

FIG. 2 illustrates a tyre 14 with reference to a coordinate axis system. It should be noted at this point that unless otherwise stated in this discussion reference to tyre-related forces and moments are made with respect to the ISO-W axis system shown in this Figure. The tyre is supported with respect to the movable test surface such that the slip angle of the tyre is controllable and such that the loading on the tyre is controllable.

Figure 3:
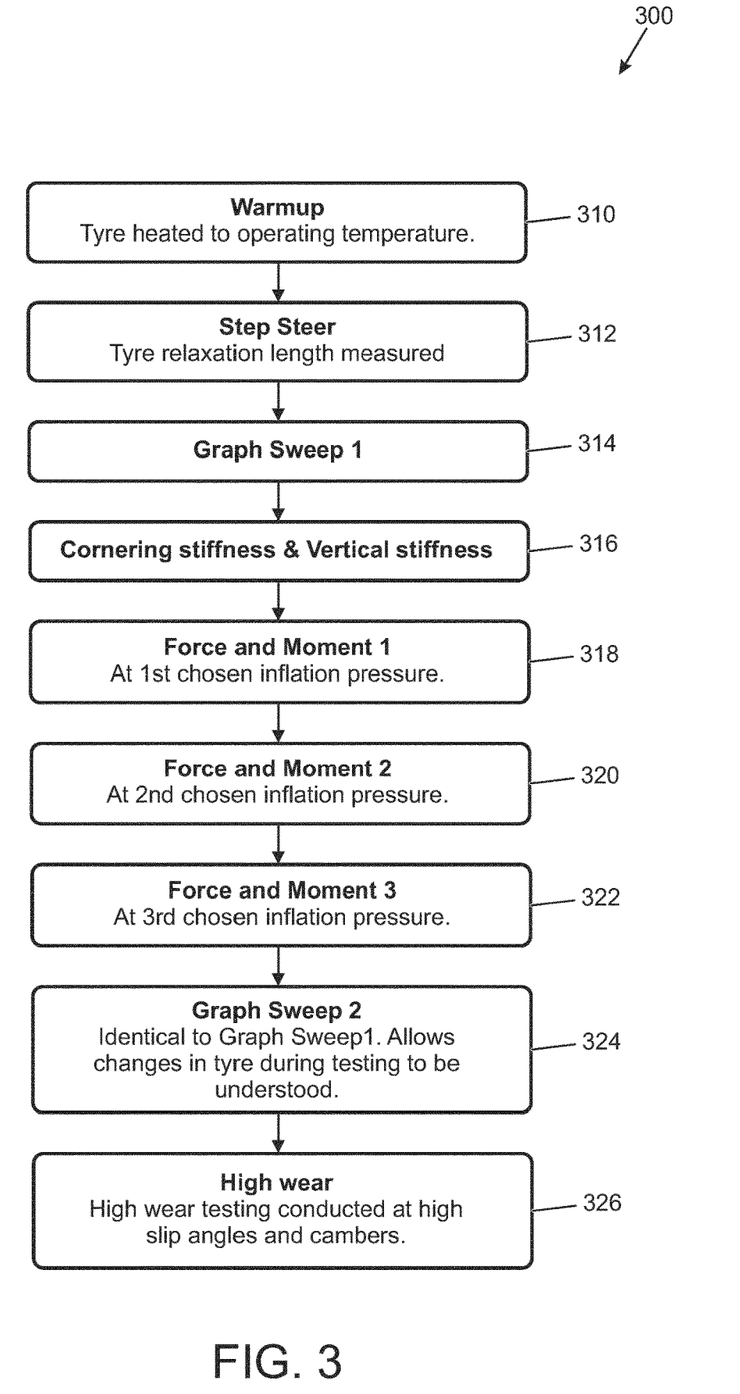
FIG. 3 is a flow chart depicting a tyre test procedure for a tyre conducted on a suitable testing apparatus for parameterising a tyre model.
Figure 4:
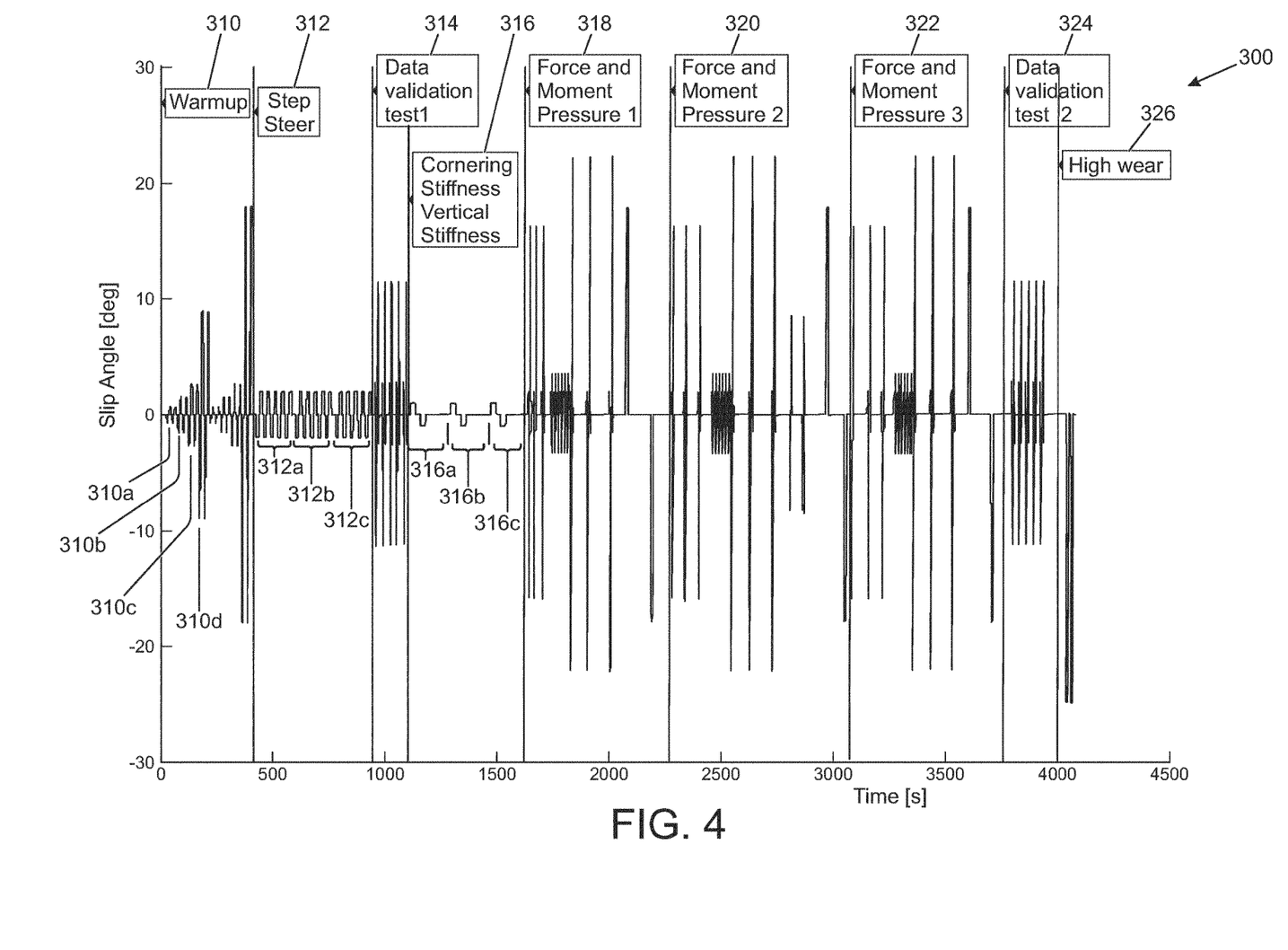
FIG. 4 illustrates an end-to-end view of the tyre test procedure in FIG. 3.

Moving on to FIGS. 3 and 4, these two figures illustrate a tyre testing procedure, labelled generally as 300, from start to finish in order to obtain data from the tyre for parameterisation of a tyre model. Whereas FIG. 3 depicts the test procedure 300 as a flow chart of a plurality of test portions 310-326, FIG. 4 shows the test procedure 300 as a plot of slip angle against time, over a time period of approximately 4000 seconds, or about 1 hr 10 minutes.

In the following discussion, the test procedure 300 will be described in general terms, and certain aspects of the test procedure, and the associated technical benefits, will be explained in more detail.

In a broad sense, an aim of the test procedure 300 is to gather high quality data for parameterisation of a tyre model but to do so more efficiently than is currently observed with established test procedures. Furthermore, an objective is to gather a complete set of data that is necessary for full parameterisation of a tyre model in a single test procedure which avoids the need to run separate tests, possibly with a change in test apparatus configuration, or the use of multiple tyres. One benefit of the embodiments of the invention described here is that they result in a significant reduction of total test time which leads to a corresponding reduction in the cost of running such tests. This is to be compared with an almost three times greater test time that is currently the case with existing testing procedures. Moreover, it is envisaged that the embodiments of the invention will gather the necessary data whilst using only a single tyre, which is to be compared with existing testing procedures that are known to use up to six tyre specimens.

The test procedure 300 comprises nine test portions in total, but begins with a warm up test portion 310 the aim of which is to bring the tyre up to an acceptable operating temperature before the main portions of the test procedure begin. The warm up test portion 310 comprises controlling the slip angle of the tyre through a series of slip angle sweep manoeuvres, or 'steering sweep procedures', during which the tyre moves from a neutral slip angle position (approximately 0 degrees of slip angle, i.e. the tyre is pointing in the direction of travel) to positive and negative slip angle positions whilst under a variety of load conditions. The precise load on the tyre during this phase may be selected to provide a suitable load on the tyre so that heat is generated within the tyre to bring it up to operating temperature ready for testing. The selected tyre load may be static, for example at a predetermined fraction (e.g. between 50% and 70% of the tyre load rating), although one option is to vary the load condition above and below a nominal load, which is based on the tyre load rating. For example, the load condition may step incrementally through a series of tyre loads between factors of around 0.5 and 1.5 of the nominal tyre load, by way of example. Each sweep may be performed at a different load condition, with the sweep starting at the nominal load. The nominal tyre load need not be the maximum associated with the tyre load rating, but instead may be a suitable proportion of the tyre load rating, for example between 50% and 70% of the load rating, which provides a reasonable indication of the load a tyre might be expected to experience, in use. For example, for a load rating of 1060 kg (10388N), a suitable nominal load might be considered to be 65% of this value, or 6752N. References herein to a 'nominal tyre load' or 'nominal load' will be understood accordingly.

In this embodiment, the warm up test portion 310 comprises a series of sets of five slip angle sweeps. There are eight sets in total, although this is only exemplary and more or fewer sets could be used. It should be noted that the sets of slip angle sweeps vary in their severity or 'aggressiveness' in that each set pushes the type slip angle to greater magnitudes and, in this way, heat is built up steadily in the tyre which helps to ensure that the tyre performs optimally during the latter portions of the test procedure 300. For instance, the first set of five sweeps, labelled here as 310a, involves the tyre being moved or 'steered' from a neutral slip angle position, to a slip angle position of −1 degree, and then back to a slip angle position of +1 degrees, which sweep is then repeated before returning the tyre back to the neutral slip angle position. So, it will be appreciated that the tyre is steered from 0 degree to −1 degree, to +1 degree, to −1 degree, to +1 degree to 0 degree. The same pattern of tyre steering sweeps is then performed again but at a higher slip angle position of approximately 2 degrees, as shown at reference 310b. Further sets of tyre sweeps are conducted at various slip angle positions, as is illustrated in FIG. 4 as 310c and 310d, although not all sets have been labelled for brevity.

Once the warm up test portion 310 has been completed, the tyre is at an acceptable operating temperature of approximately 40 degrees C. The test procedure 300 then moves on to a second test portion, referred to here as a 'step steer' test portion 312, which is configured to measure the relaxation length of the tyre under various conditions.

This test portion 312 comprises three sub-portions, labelled 312a, 312b and 312c on FIG. 4. In each sub portion 312a-c, the tyre has a predetermined vertical tyre load (e.g. the nominal tyre load) applied to it is and the tyre is then i) rolled forward to relax the contact patch, ii) stopped with the vertical load still applied, iii) steered to a 2 degrees static slip angle, and iv) accelerated while maintaining the set slip angle.

The lateral force build up compared to the forward distance travelled by the rotating tyre may then be recorded and subsequently analysed in order to calculate the relaxation length by identifying the distance travelled until the tyre's lateral force saturates. This same set of steps is then repeated at five different loads, for example which may be selected factors of the nominal tyre load. Each test sub-portion 312a-c represents the test steps as described above, but at three inflation pressures.

Following the step steer test portion 312, the test procedure 300 moves on to a first of two validation or reference test portions 314, 324. The purpose of the validation test portions 314, 324 is to provide a means to make an evidence-based assessment of tyre wear that occurs throughout the test procedure 300. The validation test portions 314, 324 involve a set of tyre sweeps that are conducted firstly near to the beginning of the test procedure, when the tyre is up to temperature but still relatively unworn, and then again towards the end of the test procedure 300. Data gathered from each of the validation test portions 314, 324 may then be analysed using appropriate statistical techniques, or by manual data fitting processes, in order to assess how the tyre has changed during the course of the test procedure.

The validation test portions 314, 324 will be described in more detail later with reference also to FIGS. 7, 8a and 8b.

Following the first validation test portion 314 the test procedure 300 moves on to the main data gathering phase, which begins with a stiffness test portion 316. Cornering stiffness and vertical stiffness are particularly important for vehicle dynamic modelling applications and so this test portion gathers high quality data on the cornering stiffness of the tyre, but also its vertical stiffness, that is to say, the stiffness of the side wall of the tyre which provides it with resistance to compression.

The stiffness test portion 316 is divided into three sub-portions, labelled here as 316a, 316b and 316c. In each of the sub-portions 316a-c, the tyre is controlled in substantially similar ways, although with some differences which will now be explained. Each of the sub-portions 316a-c involves holding the tyre at a constant 1 degree slip angle position while the load on the tyre is stepped several times, which is five times in this embodiment. Optionally the load is stepped at factors of 0.7, 1.0, 1.3, 1.6 and 2.0 times the nominal load, providing a maximum load of approximately 13 kN in this embodiment, which is not to be considered limiting. This loading pattern is then repeated at 0 and −1 degree slip angle positions, which can be seen by the 'square wave' shape on the plot in each of the sub portions.

Although it is somewhat difficult to determine directly from the scale of x-axis on FIG. 4, each of the 1 degree slip angle excursions is maintained for between approximately 20 and 50 seconds, preferably between 20 and 30 seconds. This repeating pattern of slip angle excursions with variable loading allows data to be gathered to determine cornering stiffness. Holding the tyre at low slip angles for dwell periods ensures that the tyre is in a steady state condition and allows clusters of data to be collected at each of the slip angle positions. A linear fit can then be applied to these clusters to calculate the cornering stiffness, with the 0 degrees slip angle cluster being used to improve the accuracy and establish any 'conicity' or 'plysteer' effects, such terms being understood by the skilled person.

Following the cornering stiffness parts of each sub-portion 316a-c, the latter part of each sub-portion tests vertical stiffness and involves holding the tyre at a constant zero slip condition (neutral slip angle) while the load is stepped multiple times. For example the load may be stepped for times at equal increments between 0.5 and 1.0 times the nominal load. This is then repeated at three forward velocities, for example 6 m/s, 17 m/s and 40 m/s. The vertical stiffness at each steady state condition can then be calculated using the distance ground to wheel centre and vertical load channels. Each of the sub-portions 316a-c represents the same test pattern described above, but performed at three different predetermined inflation pressures. The precise inflation pressure used is not central to the inventive concept, but, by way of example, suitable tyre pressure values may be 2.1, 2.6 and 3.3 bar (30, 38, 48 psi).

Once the stiffness test portion 316 is complete, the test procedure 300 moves on to a further test portion 318 having the objective of parameterising lateral force and self-aligning torque aspects of the tyre model. Referred to hereafter as the force and moment test 318, the test involves a series of free rolling sweeps at a selected series of tyres loads and camber angles. This test, and subsequent tests labelled 320 and 322, are the primary tests for gathering data for parameterising the tyre model.

The specific tyre movements included in the force and moment test may comprise the following:

Camber angle testing at zero slip angle to gather pure camber thrust data.

A slip angle sweep repeated with and without camber to isolate the camber effect.

One or more sweeps conducted with loads adverse to the slip angle direction; where most sweeps are conducted with negative slip angles at high load (simulating a cars right side tyre steering to the left while centrifugal force shifts the car's weight to the right) and positive slip angles under lower loads, wherein one or more sweeps may be conducted in the opposite load case in order to maximise the stability of the tyre model. This helps to ensure the model is plausible under unusual conditions such as a highly cambered road, where this load case may be possible.

The force and moment test 318 may include all of the above steps, or a selection of these. Tests labelled as 320 and 322 are repeats of force and moment test 318 featuring the same or similar tyre movement and loading patterns, but at different tyre pressures. It should be noted that three force and moment tests 318-322 have been described here since three tests have been shown to provide sufficient data to parameterise the tyre model accurately. However, more tests could be performed if desired.

The completion of the three force and moment tests 318-322 marks the end of the main data collection phase of the test procedure 300.

Before describing the next phase of the test procedure 300, a more detailed explanation will now be given regarding particular aspects of the force and moment tests 318-322.

In these tests, the tyre 14 is supported with respect to the movable test surface 12 such that at least the slip angle of the tyre 14 is variable. During a force and moment test 318-322, a slip angle sweep is performed, as discussed above, during which the tyre is steered so the slip angle varies, or is moved, between a first slip angle position and a second slip angle position. During this sweep of slip angles, the tyre is moved with a slip rate that is variable. In this context, the term variable may mean that the slip angle rate may change between a first rate value and a second rate value, or the rate may vary between multiple rate values, or even continuously. One embodiment of this is illustrated in FIG. 5.

Figure 5:
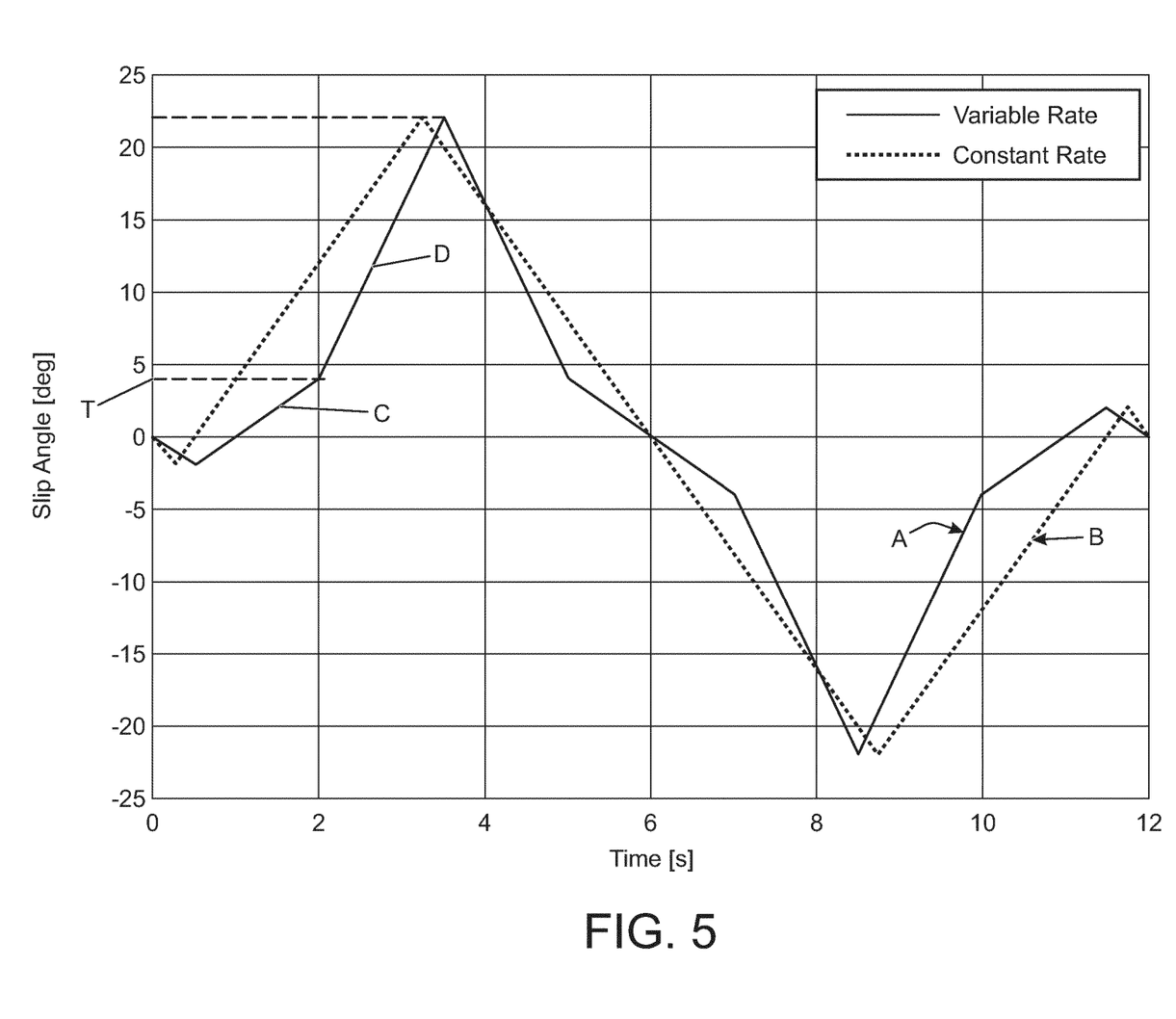
FIG. 5 is a plot of slip angle against time, and which illustrates an embodiment of the invention

In FIG. 5, a trace for variable slip rate is shown as a solid line, as labelled as 'A', and is compared with a trace for a constant slip rate as dashed line, labelled as 'B'. It should be noted that the traces illustrate a section of a steering sweep procedure as the tyre is steered between positive and negative slip angle positions. Here it will be appreciated that the tyre is steered at a low slip angle rate (less steep gradient) when the slip angle is near to zero degrees (otherwise termed a neutral slip angle position), but is steered at a greater slip angle rate when the tyre is at higher slip angles, remote from the neutral position. The approach of using a variable slip angle rate provides significant benefits. Using a low slip angle rate near to zero degrees means that the tyre is closer to a steady state condition in this region of slip angle which reduces mechanical hysteresis in the tyre. In turn, this reduces the spread of lateral force data which improves the accuracy of the data for fitting to the tyre model.

The switch to a higher slip angle rate as the slip angle increases, however, means that the tyre is swept through the relatively high slip angle range more quickly. This guards against excessive temperature increases in the tyre which would otherwise lead to thermal hysteresis, which would once again affect adversely the accuracy of the lateral force data obtained from the test. Ensuring that the tyre temperature does not build excessively also guards against over- wear of the tyre and also means that less pause time is required between tests for the tyre temperature to reduce to an acceptable start temperature. A longer pause period would increase overall test duration.

With specific reference to FIG. 5, it will be appreciated that in the variable slip rate trace 'A', the tyre is steered with a first slip rate (the section marked 'C') up to a first slip angle threshold, 'T', and then changes to a second slip rate (the second marked D).

In this embodiment, the first slip rate C is four degrees per second (4 degrees/s). This slip rate value is considered to provide an optimum result between producing a low tyre mechanical hysteresis value whilst also not increasing tyre temperature excessively. Whilst 4 degrees/s is currently considered to provide good results, it is considered that a slip rate in the range of about 1 degree/s to about 6 degrees/s would also provide acceptable results.

The second slip rate D is twelve degrees per second (12 degrees/s), in this embodiment. This slip rate value is considered to provide an optimum result between minimising thermal hysteresis, avoiding excessive heat build-up in the tyre, and guarding against excessive tyre wear. Whilst 12 degrees/s is currently considered to provide good results, it is considered that a slip rate of at least 8 degrees/s or more would also provide acceptable results.

The point at which the slip angle rate switches between the first and second slip rates, which is shown here as the slip rate threshold T, provides an optimal balance between providing good quality cornering stiffness data, represented at zero-to-low slip angles, over a sufficiently wide range whilst making sure that the tyre is swept through relatively high slip angles as quickly as possible. It was determined that four degrees per second (4 degrees/s) provides good results, although a threshold in the range 2-10 degrees/s would also provide acceptable results.

In tests conducted to compare tyre steering sweep procedure having a variable slip angle to one having a fixed slip angle rate (e.g. curve A v curve B), it was determined that the variable rate approach generated the least mechanical hysteresis at low slip conditions resulting in the best low slip angle data, whilst also generating the lowest peak temperature and hence the least thermal hysteresis at high slip angles resulting in better quality data available from the test.

The above discussion focuses on how the slip angle and slip angle rate of the tyre is controlled during the force and moment tests 318-322. One option in such tests is to apply a predetermined constant vertical load to the tyre throughout the test. This 'constant tyre load' approach is typical of the prior art. However, in an embodiment of the invention, the force and moment tests 318-322 adopt a variable tyre loading approach in order to provide a test for the tyre that is a better reflection of the loading conditions to which a tyre would be subjected when on a vehicle.

By way of further explanation, consider a tyre on the right hand side of a vehicle. When the vehicle is steered to the left, the load on the tyre increases from the static load due to the weight transfer of the vehicle during cornering. Conversely, when the vehicle is steered to the right, the load on the tyre reduces. In this embodiment of the invention, the testing apparatus controls the tyre so that tyre loading is linked to the slip angle of the tyre thereby simulating real-life weight transfer that the tyre would experience in use. The loading of the tyre can therefore be considered to be asymmetric across the range of slip angles through which the tyre is swept. This is illustrated in FIG. 6, and is explained in more detail below.

Figure 6:
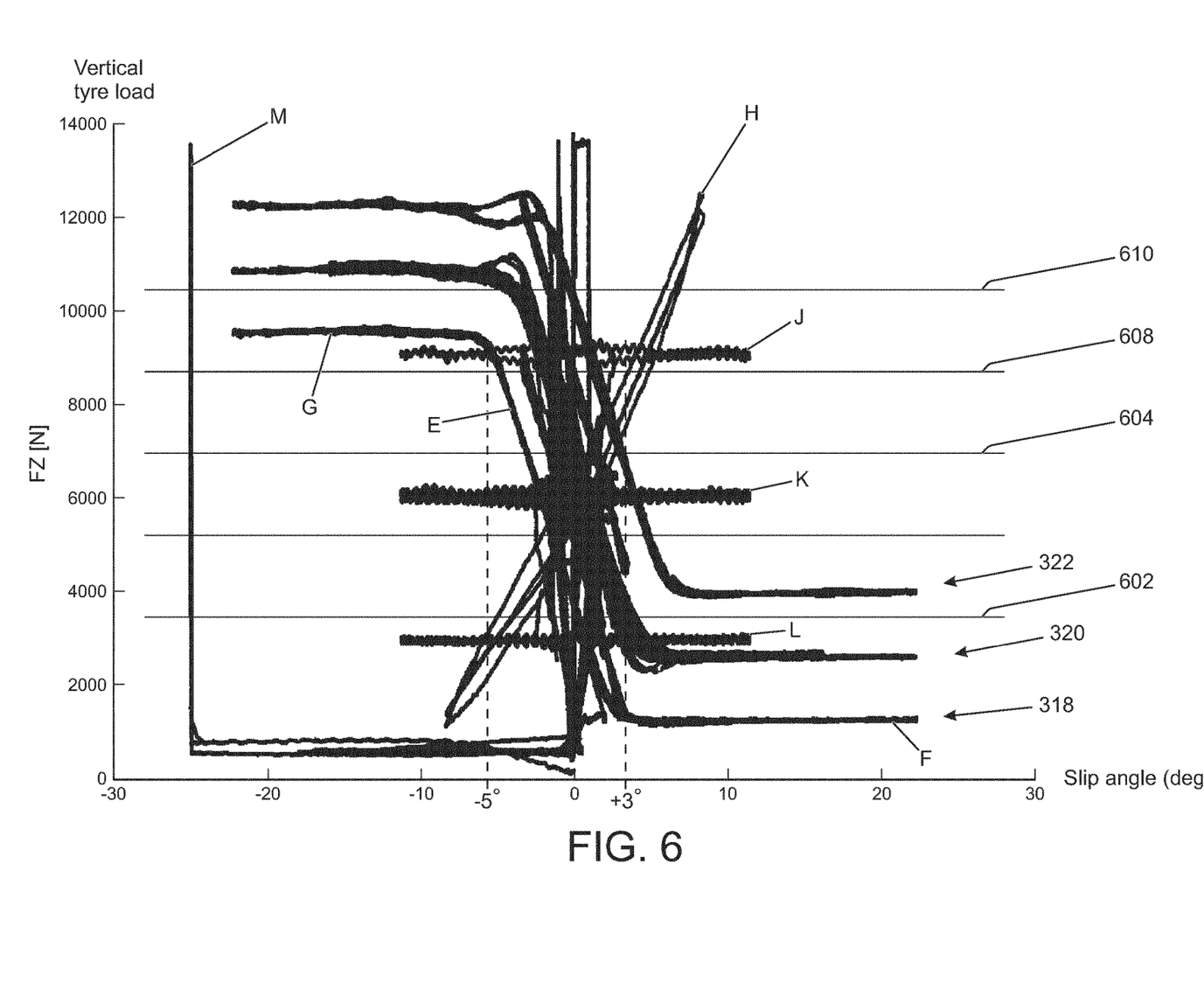
FIG. 6 is a plot of applied tyre loads against slip angle corresponding to the tyre test procedure of FIGS. 3 and 4.

In FIG. 6, the three force and moment tests 318-322 are shown as three separate 'Z' shaped curves which illustrate how the loading on the tyre is changes and the tyre is steered between positive and negative slip angles. Starting with the first force and moment test 318 as an example, which is lowest of the three curves in FIG. 6, it will be observed that the vertical loading (Fz shown on the y-axis) on the tyre varies linearly in dependence on the slip angle within a central portion of the curve, labelled as 'E'. More specifically, from neutral slip angle position (zero degrees) at which the loading on the tyre is at a first predetermined load value (approximately 7000N, in this embodiment, which is approximately the nominal load on the tyre), the loading on the tyre is thereafter controlled so as to increase progressively when the tyre is moved towards more positive values of slip angles, and to decrease progressively when the tyre is moved towards more negative values of slip angle.

The load value may be varied incrementally or continuously. This central portion extends from a first predetermined positive slip angle position of about +3 degrees to a first predetermined negative slip angle position of about −5 degrees, wherein at these slip positions the loading flattens out or 'saturates' to a substantially constant value. The saturation slip angles represent the point during the hypothetical vehicle manoeuvre where the tyre is generating peak lateral force, associated with maximum lateral acceleration, so no further weight transfer can occur. The constant loading portions, labelled as 'F' and 'G', respectively, extend to about +22 degrees and −22 degrees. In the low load constant portion F, the load on the tyre may be at a first predetermined load value being between 500N and 2000N (equating to around 0.1 and 0.3 times the nominal tyre load), but in this embodiment is about 1000N, whereas for the high load constant portion G, the load on the tyre may be at a second predetermined load value being between 8000N and 10000N (between about 1.2 and 1.5 times nominal tyre load), but in this embodiment is about 9000N. A load of around 1000N was determined to be useful in cooling the tyre since under such a load the tyre is pressed into the fluid bearing under the test surface 12. As is known in such apparatus, the fluid bearing receives a very high throughput of fluid which provides a cooling effect. A load of around 1000N was found to ensure that the tyre is cooled by the fluid bearing as it is pressed into the test surface 12, but does not result in the tyre being worked, which would otherwise generate heat.

Each of the other two Z curves 320 and 322 carries out a similar test regime but applies a different loading range to the tyre.

It should be noted that the above values of loading and slip angles are provided by way of example only and are not meant to be limiting. For example, the loading values are determined based on estimated vehicle weight for a vehicle type suited to the tyre under test, so naturally the exact loading values are likely to change from test to test from those values discussed here. Similarly, the saturation slip angles are determined based on the estimated point that a particular tyre is expected to generate peak lateral force. However, this point may be different for different tyres.

One benefit from the asymmetric loading approach is that the tyre is tested under loading conditions that the tyre is likely to experience during use. So, no time is wasted testing the tyre under unrealistic loading conditions. This reduces significantly the testing time required to generate reliable data for parameterising the tyre model. This benefit can be further appreciated by comparing the Z-curves 318-322 with the series of five horizontal lines labelled as 602-610, respectively. These lines represent typical loading conditions in the prior art 'square matrix' test, as is discussed in the introduction. In the square matrix test, a tyre is tested during a slip angle sweep procedure under a variety of constant loading conditions, represented by each of the lines in turn. However, many of the combinations of load and slip angle are unrealistic when considered in the context of a real vehicle which represents wasted test time and increased cost.

Optionally, in order to augment the test data acquired using the asymmetric loading conditions for the force and moment tests 318-322, a sweep procedure may be performed in the reverse direction, as illustrated by curve 'H' in FIG. 6. In this embodiment, a single sweep is performed between about −10 degrees and 1000N to about +10 degrees and about 13000N (approximately 1.9 times the nominal tyre load), these values being by way of example only. Curve H shows three lines, which represents the same sweep and loading regime applied at three tyre pressures. Performing the 'reverse direction sweep' provides data that maximises the stability of the tyre model. This ensures that the model remains valid during unusual scenarios, such as a highly cambered driving surface, where such a load case may be possible.

Following the force and moment tests 318-322, the test procedure 300 performs the second validation test portion 324, as mentioned above. The validation tests 314 and 324 will now be explained in more detail with reference to FIGS. 7, 8a and 8b.

Figure 7:
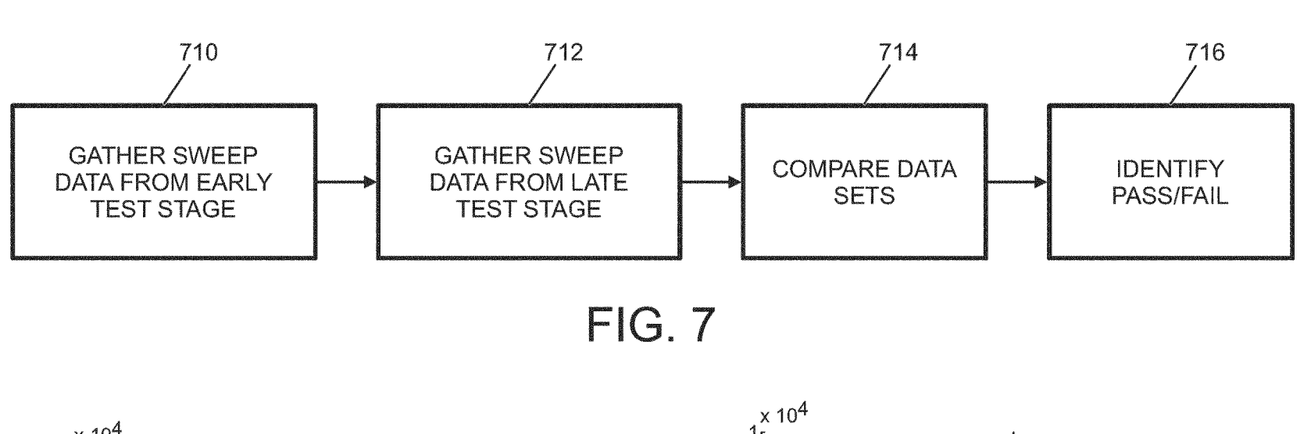
FIG. 7 is a flow chart illustrating another embodiment of the invention.

FIG. 7 provides an overview of the data validation tests 314,324. Firstly, at step 710, a first reference test on the tyre is performed, and this corresponds to the first validation step 314. This first test gathers reference data for the tyre at an early stage in the test procedure 300 because thereafter the tyre is subject to aggressive testing which will inevitably change the grip characteristics of the tyre to a certain degree. So the objective of the first validation test 314 is to capture the tyre performance at an early stage so that this data can be used to baseline, or benchmark, performance criteria. In this embodiment, the test comprises a plurality of slip angle sweeps performed with a predetermined vertical load on the tyre.

For example, the tyre may be steered with respect to the test surface 12 from a first predetermined slip angle position to a second predetermined slip angle position. In this embodiment, by way of example, five sweeps are performed between about −12 degrees and +12 degrees at selected tyre loads of approximately 3000N, 6000N and 9000N and also at varying camber angles. This can also be seen in FIG. 6, by the three horizontal lines labelled J, K and L, which show three different load values and slip angle sweeps between predetermined positive and negative positions of approximately +/−10 to 15 degrees.

During this test 314, data is recorded of the lateral force generated by the tyre and stored as a first data set in the memory area 32a of the computer system 32. Self-aligning moment (Mz) may also be recorded.

At step 712, the second validation or 'reference' test 324 is performed. In this embodiment, the tyre is controlled by the apparatus 10 in the same way as for the first validation test 314. For example, the tyre may be steered so that the slip angle changes from a third predetermined slip angle position to a fourth predetermined slip angle position. In this embodiment, the tyre is controlled once again to perform five slip sweeps between +/−12 degrees whilst loaded with selecting loads. The lateral force data generated by the tyre is recorded again by the computer system 32 and stored in the memory area 32a as a second data set.

At this point, it should be noted that although in this embodiment each of the validation tests 314,324 apply the same movements and loading patterns to the tyre, it is also envisaged that each test may have slightly different characteristics, albeit the analysis technique would have to be modified appropriately to take account of the differences.

Once the two data sets have been recorded and stored, at steps 710 and 712, the results of the tests are compared, at step 714. The comparison of the data sets can be performed using a statistical data analysis technique (e.g. R-squared) so as to quantify the variance between the two data sets. Alternatively, the comparison may be a manual process that requires the exercise of judgement to quantify the difference between the data sets, such as spread, curve shape, or unusual features, so as to make a determination as to whether the data sets are acceptably close.

Figure 8A:
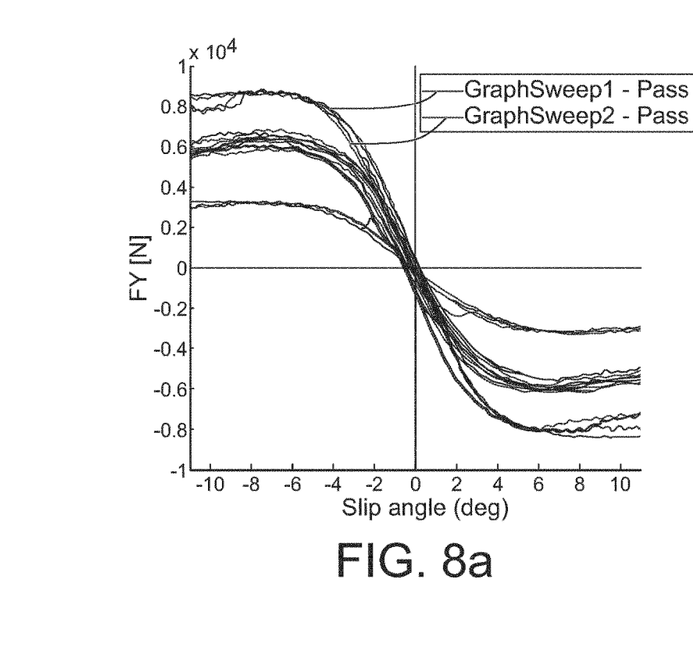
FIGS. 8a and 8b are plots of tyre load against slip angle, further illustrating the embodiment of FIG. 7 in more detail.
Figure 8B:
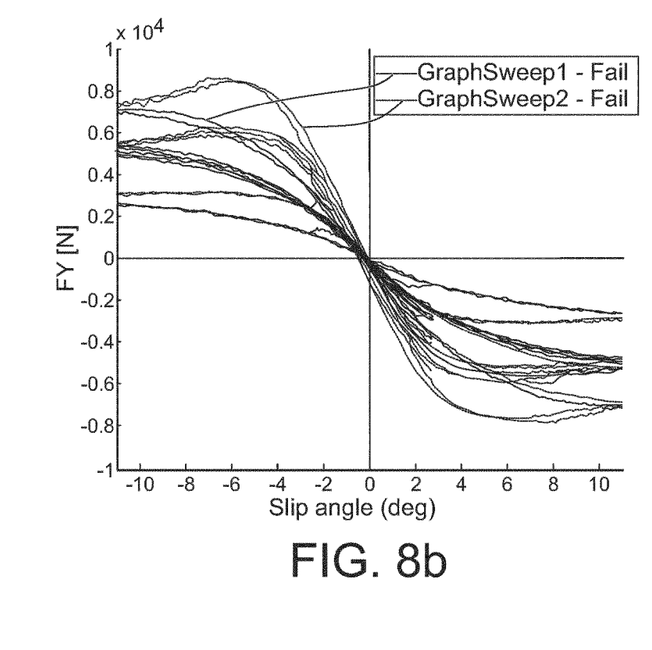

FIGS. 8a and 8b illustrate two examples of a validation test pair. FIG. 8a shows an example of a test where the tyre performs similarly at the start and end of the test, which suggests that the tyre has not changed excessively during the test procedure 300.

FIG. 8b shows another example which indicates significant variance between the first validation test 314 (GraphSweep1 on FIG. 8b) and the second validation test 324 (GraphSweep2 on FIG. 8b). Such a variance indicates that the tyre performance has changed significantly between the times of the first and second validation tests 314,324 which suggests that the tyre has worn or degraded excessively, for example due to being tested under too high load values. Here, it can be seen that the lateral force generated on the second test, and also the gradient of the centre portion of the curve, is higher in respect of the second test than for the first test. This reflects the fact that peak lateral force of a tyre increases, under dry conditions, as the tread wears.

In such a scenario the excessive variance could mean that the data would not be usable to build an accurate tyre model. Identifying a pass or fail status for the comparison of data sets, at step 716, thereby provides the personnel responsible for running the test an early indication as to the suitability of the data and so appropriate action can be taken. For example the test procedure 300 can be restarted having been suitably tuned to improve the data variance. A further advantage is that the validation test approach can be used to compare different tyres to one another so that the way in which different tyres have responded to the same test procedure 300 can be analysed.

Returning to FIGS. 3 and 4, a final test portion 326 in the test procedure has the objective of capturing tyre data that correspond to highly dynamic vehicle manoeuvres, so that the tyre model remains plausible under such scenarios. In known tyre parameterisation test procedures, the approach taken is to test the tyre under a wide range of slip angles and over a wide range of loads in order to collect as much data as possible to ensure that the model is plausible over a wide range of usage scenarios. This can be appreciated from FIG. 6, which shows four traces 602-610 of vertical tyre load against slip angle that are typically associated with the Square Matrix test procedure. Following this approach, however, means that the tyre is steered to high slip angles under many load conditions which can adversely affect the quality of the data that is recorded, generate excessive heat and wear in the tyre, and also results in lengthy test durations.

In this embodiment, whilst the majority of the test portions 310 to 324 test the tyre at fairly modest slip angle positions (mainly within the range +/−10 to 15 degrees), the final test portion 326 tests the tyre at a various vertical loads at discrete high value slip angle positions which provides suitable data for parameterisation of the tyre model that enables the model to interpolate tyre performance out to much higher slip angle positions, whilst shortening the testing time significantly.

Figure 9:
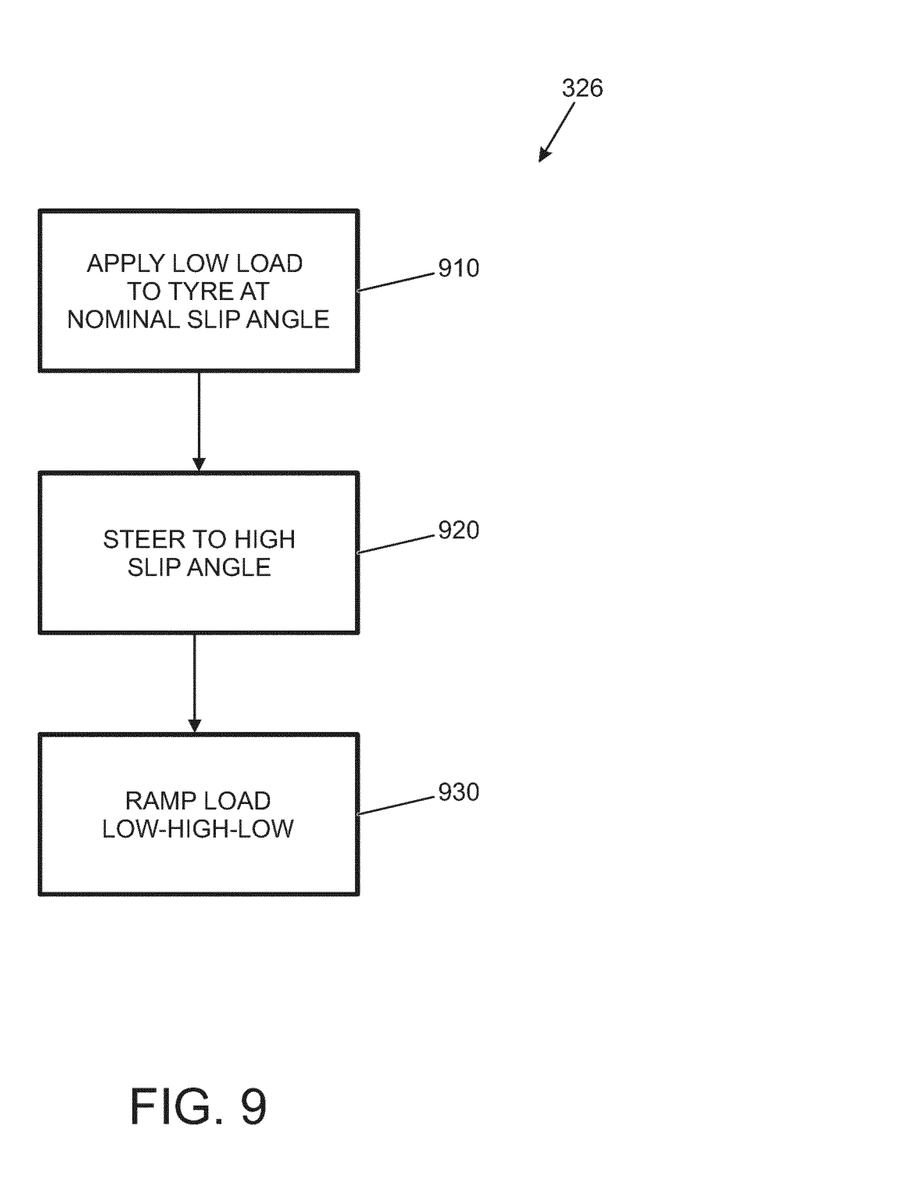
FIG. 9 is a flow chart illustrating a further embodiment of the invention.

In broad terms, and with reference to FIG. 9, the final 'high wear' test portion 326 involves loading the tyre with a predetermined value of vertical tyre load (step 910) at a neutral slip angle position, which in this case is zero degrees, although it is envisaged that the test could start from a different slip angle. In this embodiment, the predetermined tyre load is 0.1 times the nominal tyre load, which equates to between 600 and 700N.

Once the initial test conditions have been established, the tyre is steered (step 920) to a first predetermined slip angle position. The purpose of the test 326 is to gather data when the tyre is at a relatively high (positive or negative) slip angle position so, in this embodiment, it is envisaged that a range of between 15 to 30 degrees would be suitable. The precise slip angle position that is required will depend on many factors such as the tyre of tyre being tested and the vehicle dynamic application in which the eventual tyre model is intended to be used. However, in this embodiment, the tyre is steered to a slip angle value of −25 degrees.

Whilst the tyre is at this slip angle position, the tyre loading is ramped up to a second predetermined load value (step 930) which, in this embodiment, is 13.5 kN by way of example (approximately twice the nominal tyre load), and then ramped back to the initial load condition. In this embodiment, the tyre load is ramped from the start load to the maximum load as quickly as possible which may be in the region of 5000N/sec. Although not shown here, the slip angle ramp rate may be in the region of 5 to 10 degrees/s, but is given here for completeness.

The test can also be seen on FIG. 6, by the vertical trace of vertical force against slip angle, labelled as 'M'. Here, the trace M moves from a zero degree slip angle position to −25 degrees, where it remains static as the vertical load is ramped up and back to nearly 14 kN. Although in the high wear test 326 it has been explained that the load is varied while the slip angle remains constant at a relatively extreme position, this does not mean that other control aspects of the tyre also remain constant. For example, it is also possible to vary the camber of the tyre during the test. Optionally, further load sweeps could be performed at different slip positions. For example, a further load sweep test could be run at a slip position of +25 degrees.

Usefully, the high wear test 326 generates data to maximise the operating range of the tyre model for slip angle and, optionally, camber angle. However, the addition of the high wear test 326 into the test procedure 300 only increases the overall test duration by a small amount, whereas the high wear test 326 enables a much shortened test procedure to be conducted, as discussed above.

The test procedure 300 has been discussed above in detail with reference to several separate test portions. The approaches to tyre testing taken by these test portions confer significant benefits in reducing the time taken to run the test procedure end-to-end, whilst retaining the ability to gather high quality date which leads to successful parameterisation of a tyre model.

Although some variations to the test procedure 300 and individual test portions 310 to 326 have been described above, other modifications may be made without departing from the inventive concept, as defined by the claims.

The invention claimed is:

1. A method of performing a test on a tire to record data for parameterisation of a tire model, wherein the method is performed on a tire mounted on a wheel and supported on a mobile axle with respect to a movable testing surface, the method comprising:

steering the tire with respect to the test surface to vary the tire slip angle, and varying a load on the tire in dependence on the tire slip angle.

2. The method of claim 1, comprising controlling the load applied to the tire to increase the load when the tire slip angle is moved in a first direction and to decrease the load when the tire slip angle is moved in a second direction.

3. The method of claim 2, wherein at a neutral slip angle position, the load on the tire is at a first predetermined load value.

4. The method of claim 3, wherein the tire is moved from the neutral slip angle position progressively in the first direction to a first predetermined slip angle position, during which movement the load on the tire is varied progressively to a second predetermined load value.

5. The method of claim 3, wherein the tire is moved from the first predetermined slip angle position progressively in the first direction to a second predetermined slip angle position, during which movement the load on the tire is maintained at a substantially constant load value.

6. The method of claim 5, wherein the substantially constant load value is equal to a second predetermined load value.

7. The method of claim 3, wherein the tire is moved from the neutral slip angle position progressively in the second direction to a third predetermined slip angle position, during which movement the load on the tire is varied progressively to a third predetermined load value.

8. The method of claim 7, wherein the tire is moved from the third predetermined slip angle position progressively in the second direction to a fourth predetermined slip angle position, during which movement the load on the tire is maintained at a substantially constant load value.

9. The method of claim 8, wherein the substantially constant load value is equal to the third predetermined load value.

10. The method of claim 3, wherein the tire is moved from the neutral slip angle position to a first slip angle position of between +1 degrees and +10 degrees.

11. The method of claim 3, wherein the tire is moved from the neutral slip angle position to a first negative slip angle position of between −1 degrees and −10 degrees.

12. The method of claim 1, wherein the tire slip angle is controllable continuously between approximately −30 degrees and +30 degrees.

13. The method of claim 1, wherein the load on the tire is controllable continuously up to approximately 14 kN.

14. A computer program product stored on a non-transitory machine readable medium, comprising program code instructions for implementing a method in accordance with claim 1.

15. A controller including the machine readable medium of claim 14.

* * * * *